United States Patent [19]

Wojcik

[11] 4,232,425

[45] Nov. 11, 1980

[54] METHOD OF PRODUCING STABILIZED BONE

[75] Inventor: Herbert W. Wojcik, Palos Heights, Ill.

[73] Assignee: Darling & Company, Chicago, Ill.

[21] Appl. No.: 112,204

[22] Filed: Jan. 15, 1980

Related U.S. Application Data

[63] Continuation-in-part of Ser. No. 966,078, Dec. 4, 1978, abandoned.

[51] Int. Cl.³ .............................................. A22C 25/16

[52] U.S. Cl. ........................................ 17/46; 17/1 G; 241/23; 241/24; 241/65; 241/69; 260/118; 426/417; 426/480; 426/646

[58] Field of Search ............... 426/646, 641, 657, 480, 426/513, 576, 417; 17/1 G, 46; 260/117, 118; 209/2, 467; 241/23, 24, 68, 69, 74, 77, 76, 65, 29

[56] References Cited

U.S. PATENT DOCUMENTS

| | | | |
|---|---|---|---|
| 2,875,222 | 2/1959 | Dormitzer | 260/412.6 |
| 3,046,286 | 7/1962 | Speer et al. | 260/412.6 |
| 3,087,945 | 4/1963 | Schellenberg | 260/118 |
| 3,180,880 | 4/1965 | Harrison et al. | 260/412.6 |
| 3,266,543 | 8/1966 | Paoli | 241/24 |
| 3,352,841 | 11/1967 | Lyon | 260/112 |
| 3,352,842 | 11/1967 | Lyon | 260/112 |
| 3,741,772 | 6/1973 | McFarland | 426/480 |
| 3,841,569 | 10/1974 | Engelhardt et al. | 17/46 |
| 3,906,118 | 9/1975 | McFarland | 426/480 |
| 4,025,001 | 5/1977 | Yarem et al. | 241/24 |

FOREIGN PATENT DOCUMENTS

| | | | |
|---|---|---|---|
| 806705 | 12/1958 | United Kingdom | 260/412.6 |
| 502011 | 8/1976 | U.S.S.R. . | |

OTHER PUBLICATIONS

Pfaudler Conversion System, The Pfaudler Co., 1000 West Avenue, Rochester, New York.

Tasco Process, Tasco, P.O. Box 32340, Amarillo, Texas 79120.

*Primary Examiner*—Joseph M. Golian
*Assistant Examiner*—George C. Yeung
*Attorney, Agent, or Firm*—Merriam, Marshall & Bicknell

[57] ABSTRACT

A continuous process of preparing low fat stabilized bone particularly suited for producing high quality gelatin from trimmed raw bone which is preferably crushed in a pre-hogger and fed continuously to preferably a screw type press mounted within a cage having a choke and perforations in the wall of the cage through which soft non-bone material is extruded. The pressed bone which is recovered separately from the soft non-bone material has a substantially reduced content of fat and meat tissue without heating while in contact with liquid fat. The pressed bone is heated in an oven dryer to a temperature up to 250° F. (121° C.) which crisps the fat and meat tissue adhering to the pieces of bone so that the crisp fat and meat tissue is readily separated from the bone during the heating, tumbling and screening thereof. The baked crushed bone preferably after cooling is subjected to a dry separation treatment by first passing the heated crushed bone over a sizing screen which removes particles over and under a selected particle size range. The material having the selected particle size range is then continuously subjected to gravity separation by depositing the selected material on a vibrating screen air table on which the high density clean stabilized bone particles climb to the upper end of the air table and are collected as final product separately from the low density fat and meat tissue particles which are concentrated at the lower end of the air table.

14 Claims, 1 Drawing Figure

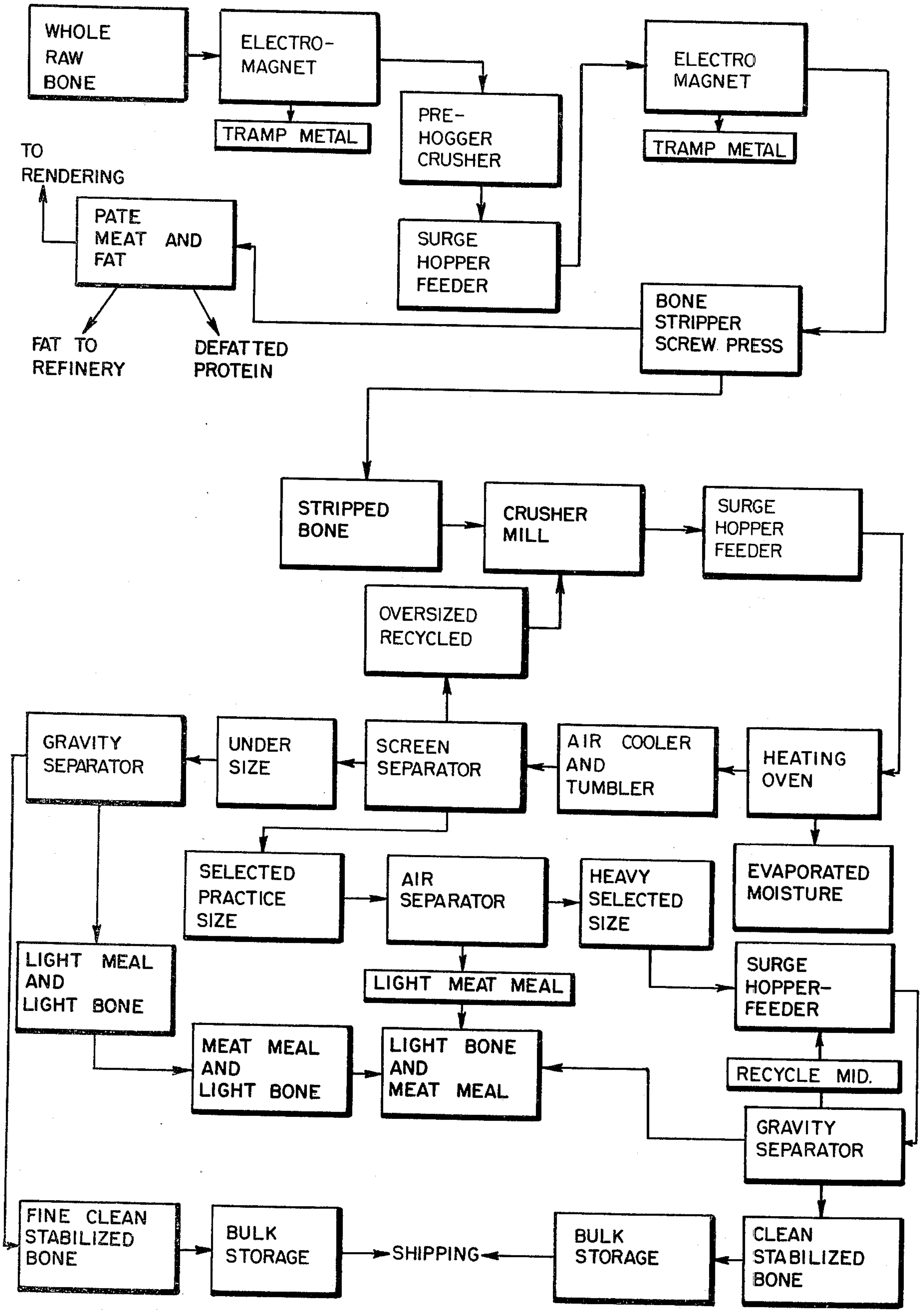
WHOLE RAW BONE
ELECTRO-MAGNET
TRAMP METAL
PRE-HOGGER CRUSHER
SURGE HOPPER FEEDER
ELECTRO MAGNET
TRAMP METAL
TO RENDERING
PATE MEAT AND FAT
FAT TO REFINERY
DEFATTED PROTEIN
BONE STRIPPER SCREW PRESS
STRIPPED BONE
CRUSHER MILL
SURGE HOPPER FEEDER
OVERSIZED RECYCLED
GRAVITY SEPARATOR
UNDER SIZE
SCREEN SEPARATOR
AIR COOLER AND TUMBLER
HEATING OVEN
SELECTED PRACTICE SIZE
AIR SEPARATOR
HEAVY SELECTED SIZE
EVAPORATED MOISTURE
LIGHT MEAL AND LIGHT BONE
LIGHT MEAT MEAL
SURGE HOPPER-FEEDER
MEAT MEAL AND LIGHT BONE
LIGHT BONE AND MEAT MEAL
RECYCLE MID.
GRAVITY SEPARATOR
FINE CLEAN STABILIZED BONE
BULK STORAGE
SHIPPING
BULK STORAGE
CLEAN STABILIZED BONE

METHOD OF PRODUCING STABILIZED BONE

This is a continuation-in-part application of co-pending patent application Ser. No. 966,078, filed Dec. 4, 1978 and now abandoned.

The invention relates generally to cleaning and stabilizing bone for producing gelatin, glue and similar proteins, and, more particularly, to a continuous process of preparing low fat clean stabilized bone of improved quality which is adapted for producing high quality gelatin and glue.

Bones, such as cattle and hog bones, contain substantial amounts of collagen and have long been used for making gelatin, glue and other protein products. In view of the decreasing availability of naturally dried bleached bone from India trimmed raw bone from meat packing plants and boning plants where carcasses are trimmed to remove most of the useful meat tissue and fat is becoming an increasingly important source of bone for making high quality gelatin and glue. The trimmed raw bone, however, contains considerably more fat and meat tissue than can be tolerated when the bone is used for making gelatin or glue, and the bone must be cleaned before it can be used for making gelatin or glue by separating fat and meat tissue from the bone.

As the bone material frequently must be held for an extended period under conditions which are conducive to spoilage before being used, the raw bone must also be stabilized so that it is capable of prolonged storage under ambient conditions without developing objectionable odors, discoloring or being attacked by bacteria, fungus or other microorganisms. In order to stabilize raw bone so that it does not develop the latter objectionable characteristics while being transported or stored, it has been found necessary to not only remove fat and meat tissue from the bone but also to heat the bone to a temperature over 180° F. to effect a kill temperature for any microorganisms present in the bone and reduce the moisture content of the bone to a level which does not support growth of microorganisms which come into contact with the bone.

When processing raw bone to be used for making gelatin or glue, fat and meat tissue adhering to trimmed raw bone previously has been treated by heating the bone while in contact with an aqueous media in the form of steam or hot water or by heating the bone in contact with liquid fat until the residual fat on the bone is liquified and so that the adhering meat tissue is cooked sufficiently to be readily separated from the bone and most of the fat can be separated from the bone prior to drying. However, when the raw bone is heated while in contact with a hot aqueous media for a period sufficiently long to effect liquifying the fat and cooking the meat tissue, a significant portion of the protein in the bone is degraded and the quality of the gelatin or glue produced from such bone is reduced, as indicated by a reduction in the gel strength of the gelatin or glue. Also, when the bone is heated in contact with liquid fat, the pores of the bone become saturated with fat and the surface of the bone material is completely covered with a layer of fat so that the appearance and quality as well as the overall economic value of the bone for making gelatin and glue are lowered and the quality of the gelatin or glue made therefrom is reduced. Therefore, higher quality bone and gelatin would be produced, if the raw bone were not heated in an aqueous medium or while in contact with liquid fat when cleaning and stabilizing raw bone.

Heretofore, valuable fat and meat components remaining on raw trimmed bone have been recovered as pate from the raw bone in a deboning process by compressing the bone in a screw type press mounted within a perforated casing havin an abutment wall or choke mounted in the end of the casing so that a portion of the fat and meat on the bone are forced through the perforations in the casing while the pressed bone and remaining fat and meat tissue are discharged from the casing separately from the fat and meat tissue discharged through the perforations in the casing wall. The pressed bone material from the deboning process has a wide range of particle sizes and contains considerable residual fat and meat tissue and has not previously been considered a suitable source of bone for producing gelatin or glue without subjecting the bone to heating in a hot aqueous medium or in liquid fat.

It is therefore an object of the present invention to provide a more economical process of producing a clean, stabilized bone material which is adapted for making gelatin and glue products utilizing pressed raw bone material.

It is also an object of the present invention to provide an improved clean, stabilized bone product which is adapted for making high quality gelatin and glue products from pressed raw bone material in a more economical manner.

Other objects of the present invention will be apparent from the detailed description and claims to follow when read in conjunction with the accompanying drawing comprising a block flow diagram illustrating the preferred process of the present invention.

A continuous process for producing clean stabilized bone of improved quality is provided in accordance with the present invention, and in general the process preferably comprises depositing raw trimmed bone as received from a meat packing plant or boning plant into a receiving bin or pit and continuously conveying the bone material by a screw conveyor or like means from the receiving bin to a pre-hogger where tramp metal is removed and the bone reduced in size from its natural state to pieces preferably ranging between about 1 and 6 inches in length suitable for feeding into a press. The bone leaving the pre-hogger is in the form of a flowable mixture containing bone, bone marrow, fat, meat tissue and liquid in the form of blood, body fluids and moisture. From the pre-hogger the bone and adhering fat and meat tissue are then fed continuously into a press, preferably a screw type press, mounted within a cage or casing having perforations or small openings in a wall thereof. The screw press preferably has a coke mounted at the discharge end for controlling the pressure applied to the bone within the cage so that sufficient pressure is applied to the raw bone in the press to force a substantial amount of the soft non-bone material, such as the fat and meat tissue which comprises muscle tissue, sinew, cartilage, tendons, etc., along with considerable liquid contained in the raw trimmed bone material and with a minor amount of small bone particles through the perforation or narrow openings in the cage and discharges the pressed bone material from the press separately from the non-bone material in a form which can be readily dried. The pressed bone material as discharged from the press has a substantially uniform composition with an average fat content at lease about 3 percent by weight and containing generally about 12 percent by wt. meat tissue and having a moisture content of about 25 percent by wt. regardless of the amount of fat, meat tussue and moisture in the raw trimmed bone material fed to the press. The uniformity in the composition of the pressed bone material as discharged from the press permits continuous economical production of uniformly high quality stabilized bone material.

The pressed bone stripped of a substantial portion of the fat, meat tissue and moisture and, while reduced to a size suitable for passing into and through an oven dryer, is preferably conveyed by suitable means to a crusher mill, such as a hammer-mill, which further reduces the size of the bone particles without, however, fine grinding or otherwise reducing a substantial portion of the bone to a particle size below about ⅛ inch. The bone from the crusher mill preferably has an average particle size of about one half inch.

The pressed raw bone as discharged directly from the press or from the crusher mill is continuously fed into an oven dryer in which the pressed raw bone material is heated until the pieces of fat and meat tissue adhering to the bone particles are crisped so that the pieces of fat and meat tissue are readily fractured and separated from the bone particles entirely by mechanical attrition during the further processing of the bone material in the screening, conveying and gravity separation treatment thereof. The oven heating or baking step which effecs crisping also inherently reduces the moisture content of the bone below 10 percent by wt. and preferably below about 5 percent by weight. The oven dryer is preferably an oven from which air is excluded as a result of heating the bone and vaporizing moisture in the pressed bone feed material, preferably to a maximum temperature of about 250° F. (121° C.), to provide an atmosphere of dry superheated steam within the oven.

The pieces of bone with adhering pieces of crisp fat and meat tissue are then subjected to a dry separation treatment in which the material is first screened to provide a selected particle size range. The selected particle size range material from the screen sizer is then continuously conveyed and deposited onto a gravity separator means which preferably comprises an inclined vibrating screen air table on which the high density clean bone particles substantially free of fat and meat tissue climb to the upper end section and are collected separately from the particles of low density fat and meat tissue which are unable to climb to the upper end of the air table. The dry separation treatment comprising screen sizing and gravity separation removes from the bone substantially all the crisped residual fat and meat tissue. The process of the present invention produces in a very economical manner a clean stabilized bone material having a fat content below 3 percent by wt. and a moisture content below 5 percent by weight which meets the specification for the highest quality gelatin bone product and yields bone which can be used for producing high quality gelatin (i.e. photographic gelatin).

Raw Bone Material

The bone material which can be processed in accordance with the present invention can be any raw bone material but preferably is trimmed beef caracass bones or trimmed hog carcass bones. Preferably the raw trimmed bones are deposited in a material receiving pit or bin with beef bones processed separately from hog bones when producing low fat stabilized bone for high quality gelatin. The degree to which the bones are trimmed to remove fat and meat tissue is not critical, since the present process is capable of handling bones having a large amount of residual fat and meat tissue. The raw bone receiving bins or pits are equipped with screw conveyor means which carry the raw bones to a pre-hogger in which the bones are reduced to a size suitable for feeding into a press for further processing.

The Pre-Hogger

The pre-hogger has associated therewith an electromagnet which removes tramp metal before the raw bone is fed into the pre-hogger which can be of any conventional design comprising a rotating cylinder having a plurality of spaced teeth on the surface which pass through spaced bars mounted in a fixed backing plate. The teeth co-act with the plate to crush the raw bone and adhering material to form relative uniform sized pieces but without fine grinding. For example, the pre-hogger used to process bone for a screw-type press having a 12 inch inlet opening preferably is adapted to produce pieces of crushed bone which ranges in size between about 1 inch by 1 inch and about 1 inch by 6 inches. The crushed raw bone is then conveyed to a surge-hopper-feeder which is adapted to hold a large quantity of crushed bone material (i.e. 40,000 lbs.) in order to insure a continuous supply of raw bone material for further continuous processing in a bone stripper means when the raw trimmed bone is intermittently delivered to the receiving pits. The raw crushed bone material as discharged from the pre-hogger has an approximate composition on a weight basis of about 30 to 40 percent moisture, about 30 to 40 percent meat tissue, about 20 to 30 percent fat, and the balance 20 percent bone with a bulk density of about 56 pounds/ft$^3$.

Raw Bone Stripper

Conveyor means carry the raw bone preferably from the surge-hopper over a second magnetic separator which removes any remaining tramp metal and continuously feeds the raw bone into a screw type press mounted within a cage which preferably has lateral slots therein spaced a distance less than the minimum size desired in the final product (i.e. about 0.095 inches when producing bone for high grade gelatin) and a choke mounted axially therein at the discharge end of the cage adapted to maintain a pressure on the raw crushed bone within the cage of from about 250 to 500 psi. A satisfactory raw bone press of the foregoing type is a 10" "Duke Pressor" manufactured by the Dupps Company of Germantown, Ohio. The 10" "Duke Pressor" has a capacity of about 20,000 pounds per hour and employs an interrupted screw flight to prevent forming a mass of bone particles along the wall of the cage. When producing bone for high grade gelatin with the 10" "Duke Pressor" a choke pressure of preferably about 300 psi is applied to the bone material using 75-80 percent power in a 200 horsepower electric motor for efficiently separating the soft tissue and fat from the raw trimmed bone material. The pressed bone material is discharged from the raw bone stripper at a rate of about 11,000 pounds per hour and is reduced in size to pieces having a maximum diameter of about 1½ inches with the size generally ranging from about ⅛ inch to 1½ inch and an average size ranging between ¼ inch and 1¼ inches. Regardless of the composition of the raw bone fed to the press, the pressed bone material as discharged from the screw press when operated in the foregoing manner has a fairly uniform composition and contains between about 20 to 25 percent moisture, about 10 to 12 percent meat tissue and generally between about 3 and 6 percent fat, all on a wt. basis. The density of the pressed bone material is about 56 pounds per cubic foot. As discharged from the stripper, the pressed bone has a temperature of between about 110° F. to about 120° F. due entirely to friction within the press. It will be evident that in the foregoing preferred embodiment a major proportion of the fat and meat tissue associated with the trimmed raw bone which is fed to the press is removed by the press and that the screw press is very effective in removing fat and meat tissue from the crushed bone material without the necessity of contacting the bone with a hot aqueous solution or molten fat. If less pressure is applied to the raw trimmed bone in the press, the pressed bone will have a larger average particle diameter (i.e. size) and contain a higher percentage of fat, meat tissue and moisture. The resulting pressed bone product would then require a longer heating cycle or a higher temperature in the oven drying and crisping step.

The soft tissue and fat which is discharged through the slots in the cage of the press are further processed to provide valuable products, such as pate, meat flavors, and rendered fat.

The Crusher Mill

While the pressed raw bone material from the stripper is reduced to a size range suitable for feeding directly to a baking oven, it is preferred when producing clean stabilized bone for high quality gelatin to feed the pressed raw bone material into a conventional hammer mill which does not have a bottom screen to further reduce the size of the pressed bone material to an average size of about ½ inch without forming substantial proportion of bone particles less than ⅛ inch in diameter. A crusher mill suitable for use in reducing the bone to the foregoing particle size can be any conventional hammer mill, such as the Prater Mill manufactured by the Prater Hammer Mill of Chicago, Illinois. The crushed pressed raw bone is preferably stored in a large surge-hopper-feeder bin in order to provide a continuous supply of material to the baking oven (i.e. oven dryer).

The Baking Oven

The baking oven in addition to removing moisture associated with the pressed raw bone material heats the meat tissue and fat tissue adhering to the pressed raw bone material supplied directly from the press or preferably directly from the hammer mill to the oven through an air lock to a temperature which effects crisping the pieces of fat and meat tissue adhering to the bone particles before the bone material is discharged from the oven so that fat and meat tissue are more frangible and more readily fractured and separated from the particles of bone during passage through the oven and during the subsequent processing of the bone material. The preferred type of oven excludes air from the heating chamber in order to minimize the risk of scorching or burning the fat or meat tissue and thereby reduce the value of the bone and the organic material adhering to the pressed raw bone material. The pressed raw bone material is heated to a temperature between 210° F. and 250° F. (99° C. and 121° C.) for a period of between about 20 to 40 minutes and preferably to about 250° F. for about 30 minutes, to effect crisping the residual fat and meat tissue on the pressed raw bone material. It is also preferred that the moisture which is vaporized during baking provide an oxygen-free atmosphere of superheated steam within the interior of the oven. An oven which has been found particularly suitable for baking and drying the crushed pressed raw bone material at a rate of about 7000 pounds per hour is a continuous rotating tray type vertical transfer dryer, such as a Wyssmont "Turbo Dryer" manufactured by the Wyssmont Company, Fort Lee, New Jersey, operated at a temperature of about 250° F. (121° C.) with a total residence tie of the bone in the oven dryer being about 20 minutes. In the Wyssmont "Turbo Dryer", the crushed bone material is continuously moved through the oven having a plurality of vertically spaced trays which are continuously rotating about the vertical axis of the oven and has stationary wipers which wipe the pressed bone material off each tray onto a tray below while continuously circulating heated gas around the trays.

Other types of heaters can be used for drying the raw bone and crisping the fat and meat tissue adhering particles, such as a rotary hot air direct fired rotating drum, but care must be exercised to avoid using such elevated temperatures or prolonged retention times within the drum which result in burning or scorching the pressed raw bone material, particularly when drying bone particles of about ½ inch in diameter or larger. A direct fired rotating drum must be used to dry bone material which has been rendered in liquid fat and/or reduced in size while in contact with liquid fat, since the bone must be heated to a temperature sufficient to effect burning off the surface fat (i.e. about 400° F.–500° F.) in order to reduce the fat content of the bone to the level required to provide a low fat stabilized bone product suitable for making high quality gelatin. Since the raw pressed bone material fed tote oven dryer in the present process does not have the surface thereof coated with fat, the present process does not require the use of a direct fired rotating drum dryer to burning off surface fat during the drying step to meet the "low fat" requirement. Thus, the stabilized bone product of the present process has a clean light color rather than having a dark discolored appearance as a result of "burning off" surface fat.

The crisped bone material from the baking oven is preferably air cooled to about ambient temperature after it is discharged from the baking oven and while being transported on a tumbling conveyor means by enclosing the conveyor within an air cooled jacket to further increase the fragility of the crisped pieces of fat and meat tissue adhering to the bone particles before depositing the baked bone material onto a screen separator or sizer which separates out material having a selected range of particle size desired in the final bone product.

Vibrating Screen Separator

When preparing clean stabilized bone for making gelatin of high quality, the gelatin manufacturers prefer bone having a particle size range of between about ⅛ inch to about ¾ inch. An apparatus suitable for separating bone material having a selected particle size range is a vibrating two deck gravity screen separator adapted to remove particles of bone and organic tissue which are larger or smaller than desired in the final product. The upper of the two spaced vibrating screens when producing high grade gelatin bone preferably is a 2-mesh screen which retains particles in excess of about ¾ inches in diameter and the lower screen is a 6-mesh screen which retains particles larger than about ⅛ inch so that the selected middle fraction which is recovered for further processing has a size range of 3/16 inches to ⅝ inches in diameter. The oversized material is preferably recycled to the crushing mill and the undersized material having a particle size below 3/16 inches is conveyed to a gravity separator preferably of the same type used for the selected particle size material which recovers clean heavy fine bone material. The undersize material can be used for preparing gelatin or glue of high quality. A suitable screen separator or sizer for use in the process is a 34–4800 "Screenaire" vibrating screen separator manufactured by Forsbergs, Inc. of Thief River Falls, Minnesota, which has a capacity of about 12,000 pounds per hour.

The selected sized material from the screen separator is preferably passed through an air separator before transfer of the material to a gravity separator to remove the very low density particles in order to increase the efficiency of the gravity separation.

The Gravity Separator

The selected sized material is continuously conveyed to a dry gravity density separator which is adapted to remove the low density non-bone particles of fat and meat tissue and provide a clean high density bone fraction which form the desired low fat stabilized bone product having a particle size within the selected range preferred for making high grade gelatin. The density separation is carried out by continuously depositing the selected size material from a surge-hopper by means of a vibrator feeder onto the dry gravity separator table which in the preferred form comprises a reciprocating inclined air table having a 10-mesh screen deck. The particles of bone having a hgh density move upwardly over the screen deck and are collected at the upper end separately from the low density particles of fat and meat tissue along with a small amount of light bone remaining in the selected particle size material. The very low density material which concentrates at the bottom of the inclined separator table is comprised essentially of crisped fat and meat tissue and is discharged as culls which can be used in meat meal. The intermediate density particles are preferably recycled through the gravity separator. A suitable gravity separator for use in the process is a Forsbergs Model 200-V gravity separator manufactured by Forsbergs, Inc. which has a capacity of about 4000–5000 pounds per hour. The air pressure, the rate of reciprocation as well as the inclination of the screen deck of the Forsbergs gravity separator can be varied to provide the desired degree of density separation and final product.

The high density material which is collected at the upper end section of the gravity separator table in the foregoing process is high quality, low fat, clean, stabilized bone material. The clean stabilized low fat bone product produced in the above described manner from raw trimmed beef bones when shipped has as a typical composition: 4.65 percent moisture, 2.49 percent fat, 29.05 percent protein, and 61.68 percent ash, all on a weight basis. The last 500 ton production lots of low fat stabilized bone made in accordance with the herein disclosed preferred process has had an average fat content of 1.78 percent, an average moisture content of 3.72 percent, an average protein content of 30.0 percent, and an average ash content of 63.5 percent, all on a weight basis. The low fat stabilized bone product is capable of being used for making high quality gelatin (i.e. photographic gelatin).

The yield of clean stabilized bone having the indicated select particle size range and the foregoing analysis produced by the herein disclosed process has been as high as about 15.6 percent by weight but averages about 12 percent by wt. based on 100 percent of the raw trimmed bone deposited in the receiving pits. About 46.4 percent of the raw trimmed bone fed to the screw press is recovered as stripped pressed bone. The selected particle size fraction of the bone being fed to the air table (i.e. bone having a particle size range between about 3/16 to ⅝ inches) comprises about 29.47 percent by weight of the original raw bone material. And, the clean stabilized fine bone material or "rice bone" obtained from the undersized material recovered from the screen separator ranges between about 8 to 12 percent by wt. with an average of about 10 percent by weight of the original raw trimmed bone material depending on the amount of pressure applied in the press and the manner in which the crusher mill is operated. The "rice bone" is of substantially the same high quality as the fraction of high density gravity separated stabilized bone product having the selected particle size range.

It will be understood that the process of the present invention is adapted to provide a continuous and essentially automated process of producing clean stabilized bone of high quality from raw bone material of various sources and having varying amounts of fat, meat and the like organic tissue adhering thereto or admixed therewith. It will also be evident that modification can be made in the type of apparatus used in the system without departing from the inventive concept disclosed herein. Thus, while a screw type press used in the specific embodiment is preferred, it is within the scope of the invention to use other presses, such as expellors which are used for removing moisture from vegetables and including a piston type press having a piston mounted within a cylinder the end wall of which is provided with discharge openings through which fat and meat tissue are discharged, such as disclosed in U.S. Pat. No. 3,841,569. Further, two or more heating ovens, screen separators or gravity separators can be used so that surge-hoppers for storing the bone material between processing steps can be eliminated. Also, where the desired low fat stabilized bone product must have a particle size larger or smaller that that required for the production of high quality gelatin, the apparatus which crushes and sizes the bone material can be varied to produce the particle size desired in the final product. Other modifications will be obvious to those skilled in the art without departing from the scope of the herein disclosed invention and accompanying claims.

The term "stable", "stabilizing" and "stabilized" as used in the specification and/or claims to characterize bone formed according to the present invention designate bone material which when held for a prolonged period does not develop objectionable odors, does not discolor and is not attacked by bacteria, fungus or similar microorganisms. The foregoing criteria require in bone intended for use in producing high quality gelatin that the bone be substantially free of adhering meat tissue and have a low fat content (i.e. a maximum fat content of 3 percent by weight) in order to facilitate the production of high quality gelatin without fat interference, even though bone can be stabilized with a higher fat content (i.e. up to 10% by wt.). The bone material must also be heated during processing to effect stabilizing, preferably when removing moisture, to a temperature above 180° F. (82° C.) to produce a "kill temperature" for any microorganisms which may contaminate the raw bone and to simultaneously reduce the moisture content of the bone to a maximum moisture content of 12 percent by weight and preferably below 10 percent by weight so that growth of microorganisms will not be supported.

The term "meat tissue" as used in the specification and/or claim designates animal body tissue other than fat tissue and bone and includes not only the conventional muscle tissue but also sinew, tendons, cartilage and other tissue which is softer and less dense than bone.

I claim:

1. Process for cleaning and stabilizing raw bone consisting essentially of:

(a) reducing raw bone from its natural state to a size suitable for passing the raw bone into a press with a screw-type conveyor and feeding said raw bone having soft non-bone material including moisture, fat and meat tissue associated therewith into said press with said screw-type conveyor mounted within a cage having at least one wall provided with apertures smaller than the minimum size desired in the bone product, (b) applying pressure by means of said screw-type conveyor to said raw bone within said cage to force fat and meat tissue through said apertures in the cage and discharging from said cage separately from said fat and meat tissue pressed raw bone material having a particle size ranging between about ⅛ inch and about 1½ inches stripped of a substantial portion of said fat and meat tissue associated with said raw bone, (c) feeding pressed raw bone material having a particle size between about ⅛ inch and about 1½ inches and having moisture and residual fat and meat tissue associated therewith into an oven dryer and heating said pressed raw bone material therein without scorching said raw bone material to reduce the moisture content of said bone material and effect crisping said residual fat and meat tissue remaining on said pressed raw bone material whereby said crisped fat and meat tissue are adapted to be separated from the pressed bone material by fracturing the crisped fat and meat tissue during screening and gravity separation treatment of said bone material, (d) passing said bone material from said dryer through a screen separator means which removes all but a selected range of particle size from said bone material, and (e) feeding said bone material having the selected range of particle size to a gravity separator means from which high density clean stabilized bone product suitable for making high quality gelatin is recovered separately from low density material.

2. A process for cleaning and stabilizing raw bone comprising;

(a) reducing raw bone from its natural state to a size suitable for passing the raw bone into a press with a screw-type conveyor and feeding said raw bone having soft non-bone material including moisture, fat and meat tissue associated therewith into said press with said screw-type conveyor mounted within a cage having at least one wall provided with apertures smaller than the minimum size desired in the bone product, (b) applying pressure by means of said screw-type conveyor to said raw bone within said cage to force fat and meat tissue through said apertures in the cage and discharging from said cage separately from said fat and meat tissue pressed raw bone material having a particle size ranging between about ⅛ inch and about 1½ inches stripped of a substantial portion of said fat and meat tissue associated with said raw bone, (c) feeding pressed raw bone material having a particle size between about ⅛ inch and about 1½ inches and having moisture and residual fat and meat tissue associated therewith into an oven dryer without said raw bone material being heated while in contact with liquid fat and heating said pressed raw bone material therein without scorching said raw bone material to reduce the moisture content of said bone material and effect crisping said residual fat and meat tissue remaining on said pressed raw bone material whereby said crisped fat and meat tissue and adapted to be separated from the pressed bone material by fracturing the crisped fat and meat tissue during screening and gravity separation treatment of said bone material, (d) passing said bone material from said dryer through a screen separator means which removes all but a selected range of particle size from said bone material, and (e) feeding said bone material having the selected range of particle size to a gravity separator means from which high density clean stabilized bone product suitable for making high quality gelatin is recovered separately from low density material.

3. A process for cleaning and stabilizing trimmed raw bone comprising:

(a) reducing trimmed raw bone having fat, meat tissue and moisture associated therewith to a size suitable for passing said raw bone into a press having a cage with at least one wall of the cage provided with apertures smaller than the minimum particle size desired in the bone product and feeding said raw bone into said press, (b) applying pressure to said raw bone within said cage to force fat, meat tissue and moisture through said apertures in the cage and discharging pressed raw bone material from said cage reduced to a size suitable for feeding into an oven dryer and stripped of a major portion of said fat and meat tissue associated with said trimmed raw bone, (c) feeding pressed raw bone material having residual fat, meat tissue and moisture associated therewith into an oven dryer without said raw bone material having been heated while in contact with liquid fat and heating said pressed raw bone material in said oven dryer without scorching said raw bone material to effect reducing the moisture content of said pressed raw bone material to a level required for stabilizing said raw bone material and crisping said residual fat and meat tissue on said pressed raw bone material whereby said crisped fat and meat tissue are adapted to be separated from the pressed bone material for fracturing the crisped fat and meat tissue while said bone material is being moved through a subsequent screen separator means and a dry gravity separator means, (d) passing said bone material through a screen separator means which removes all but a selected range of particle size from said bone material, and (e) feeding said bone material having said selected range of particle size to a dry gravity separator means from which high density clean stabilized bone product is recovered separately from low density material formed essentially of crisped fat and meat tissue.

4. A process as in claim 3, wherein said pressure is applied to said raw bone by a screw-type press having an interrupted screw flight and a choke axially mounted at the end of said cage through which the pressed bone material is discharged.

5. A process as in claim 3, wherein said pressure applied to said raw bone within said cage is between about 250 psi and 500 psi.

6. A process as in claim 3, wherein said pressure is applied to said raw bone in a piston-type press.

7. A process as in claim 3, wherein said pressed raw bone material is heated in said oven dryer having an oxygen-free atmosphere.

8. A process as in claim 3, wherein said pressed raw bone material is heated in an oven dryer having an oxygen free dry atmosphere of superheated steam.

9. A process as in claim 3, wherein said pressed raw bone material is heated in an oven dryer having a plurality of vertically spaced trays continuously rotating about the vertical axis of the oven dryer with the bone material being moved through the oven dryer by being wiped off each tray onto a tray below by stationary wipers while continuously circulating a heated gas around said trays.

10. A process as in claim 9, wherein said pressed bone material is heated up to a temperature of about 250° F. (121° C.).

11. A process as in claim 3, wherein said pressed raw bone fed to said oven dryer has a particle size substantially within a range between about $\frac{1}{8}$ inch and about $1\frac{1}{2}$ inches.

12. A process as in claim 11, wherein said pressed raw bone material has an average particle size of about $\frac{1}{2}$ inch.

13. A process as in claim 3, wherein the said bone material is cooled to about ambient temperature before passing said bone material into said screen separator means.

14. A process as in claim 3, wherein bone material of the said selected range is subjected to an air separation treatment to remove the lowest density fraction therefrom prior to feeding said bone material to said gravity separator means.

* * * * *

UNITED STATES PATENT AND TRADEMARK OFFICE

CERTIFICATE OF CORRECTION

PATENT NO. : 4,232,425

DATED : November 11, 1980

INVENTOR(S) : Herbert W. Wojcik

It is certified that error appears in the above-identified patent and that said Letters Patent are hereby corrected as shown below:

Col. 2, ln. 7, "havin" should read --having--.

Col. 3, ln. 27, "effecs" should read --effects--.

Col. 6, ln. 9 "tie" should read --time--.

Col. 6, ln. 34, "tote" should read --to the--.

Col. 8, ln. 45, "that" should read --than--.

Col. 10, ln. 62, "for" should read --by--.

Signed and Sealed this

*Third* Day of *March 1981*

[SEAL]

*Attest:*

RENE D. TEGTMEYER

*Attesting Officer* *Acting Commissioner of Patents and Trademarks*